March 17, 1936.  J. F. LEVAN  2,034,477

WIND WING FOR MOTOR VEHICLES

Filed March 16, 1934    2 Sheets—Sheet 1

INVENTOR.
John F. Levan
BY Bodell & Thompson
ATTORNEYS.

March 17, 1936. J. F. LEVAN 2,034,477
WIND WING FOR MOTOR VEHICLES.
Filed March 16, 1934   2 Sheets-Sheet 2
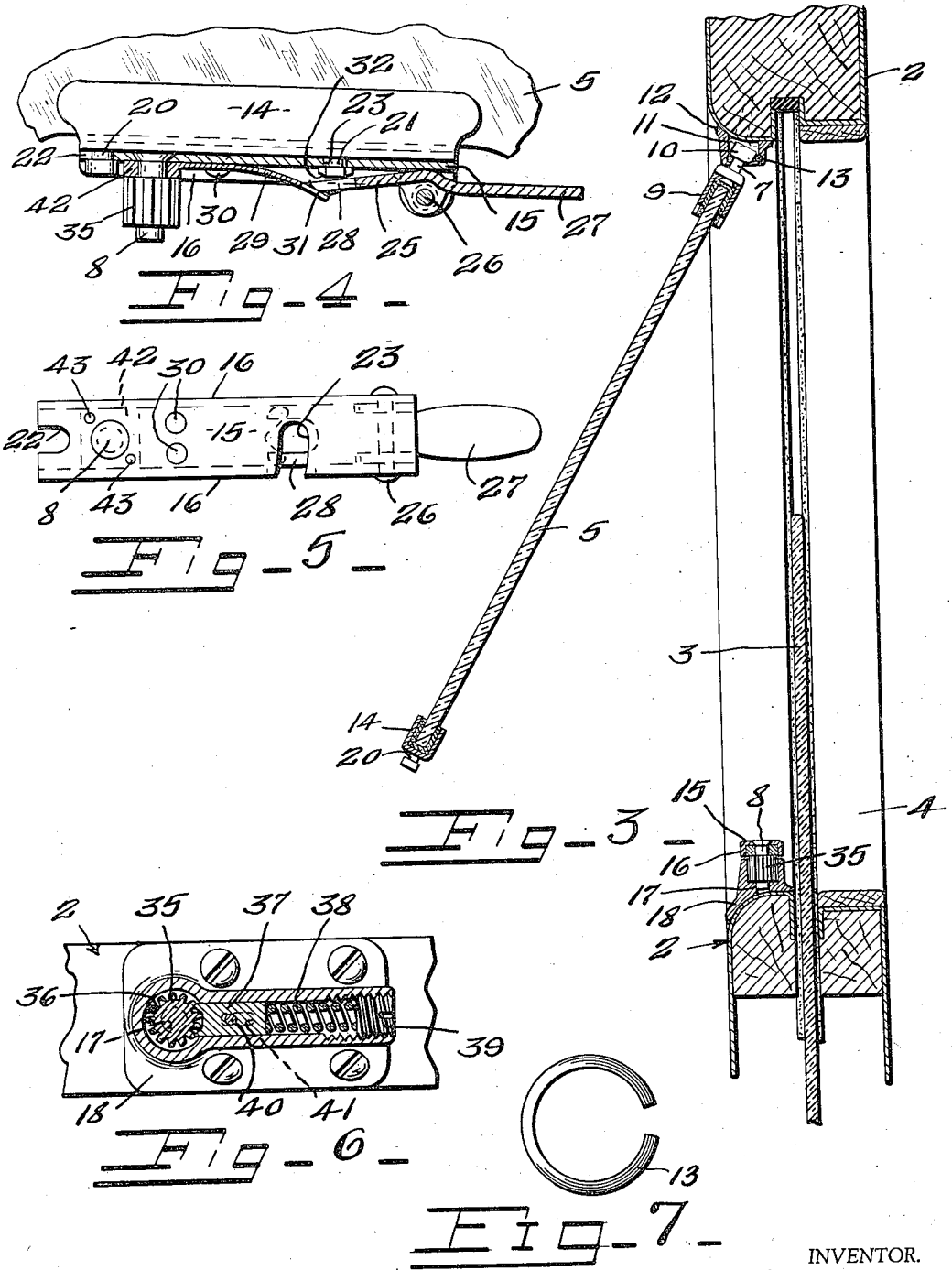
INVENTOR.
John F. Levan
BY
ATTORNEYS.

Patented Mar. 17, 1936

2,034,477

UNITED STATES PATENT OFFICE 2,034,477

WIND WING FOR MOTOR VEHICLES

John F. Levan, Elkhart, Ind., assignor to Excel Curtain Company, Elkhart, Ind., a corporation of Delaware Application March 16, 1934, Serial No. 715,926

10 Claims. (Cl. 296—84)

This invention relates to adjustable ventilating windows for vehicles, as motor cars or what for convenience are called wind wings.

One of the principal objects of the invention is a wind wing which can be displaced or partially demounted for the purpose of making the window glass or pane behind the wing available for washing or for any other purpose.

Another object of the invention is a quick releasable coupling by means of which the wing may be demounted from one of its pivotal connections for the purpose of displacing the wing and also a mounting for the other pivotal connection by which it has a universal joint movement for permitting the wing to be displaced when the wing is uncoupled from one of its pivotal connections.

It further has for its object a mounting by which the wing is located within the width of the window frame, that is, in the window opening at one side of and close to the glass pane in said opening.

It further has for its object a coupling between one of the pivoted edges, as the lower edge of the wing, and the window frame, which is uncoupled by means of successive pivotal and edgewise movements of the wing and coupled in the reverse order and further has for its object a simple and compact and quickly releasable latch for normally holding the parts of the coupling in coupled relation.

It further has for its object a particularly simple and efficient ratchet mechanism for holding the wing in any angular position.

Other objects will appear throughout the specification.

The invention consists in the novel features and in the combinations and constructions hereinafter set forth and claimed.

In describing this invention, reference is had to the accompanying drawings, in which like characters designate corresponding parts in all the views.

Figure 3 is a sectional view on line 3—3, Figure 1, the same being shown as demounted from its pivotal bearing and swung outwardly about the upper pivotal bearing, which has a universal joint action.

Figure 4 is a fragmentary view partly in section illustrating the coupling at the lower edge of the wing.

Figure 5 is a plan view of the lower member of the coupling.

Figure 6 is a fragmentary view illustrating, in section, the ratchet mechanism for holding the wing in any one of a plurality of angular positions.

Figure 7 is a detail view of the snap ring for holding the ball of the universal joint in its socket.

Figure 1:
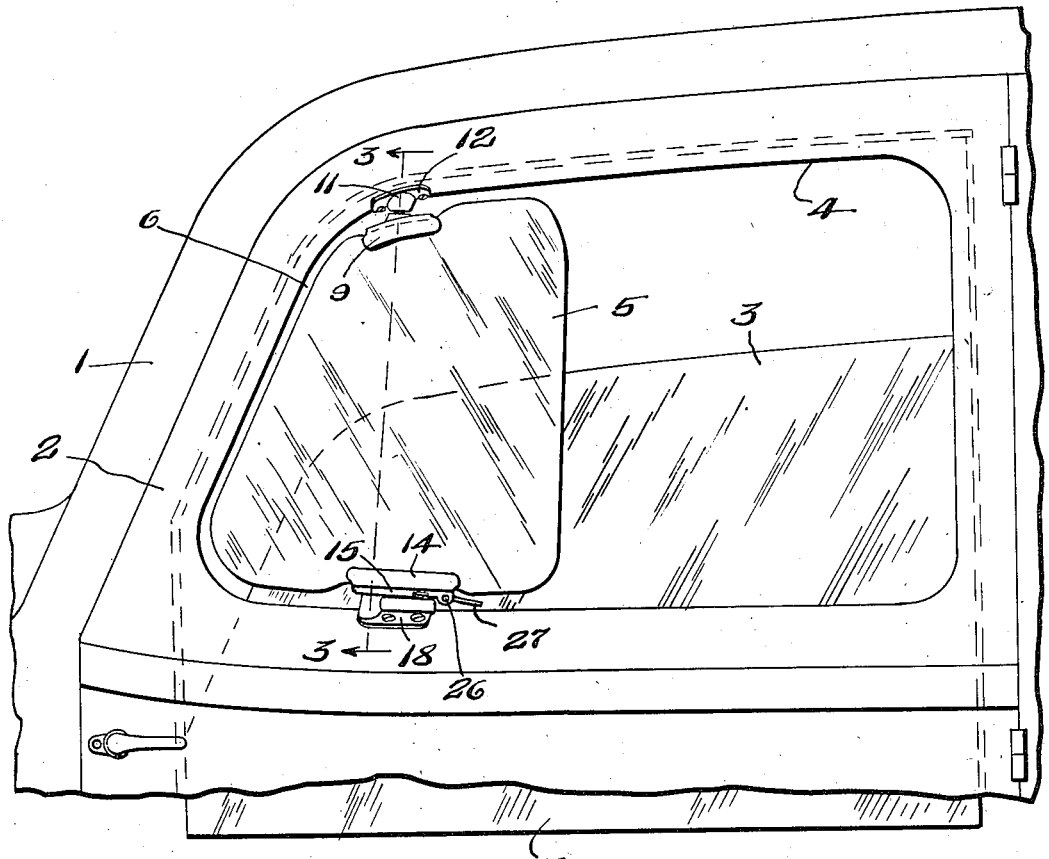
Figure 1 is a fragmentary side elevation of an automobile body embodying this invention.

I have here shown my invention as applied to the forward side window of an automobile.

1 designates the vehicle body which includes the door 2. The body or the door is formed with the usual well in the portion below the belt into which the window or glass 3 is raised and lowered, which window 3 opens and closes the window opening 4 in the body or door 2.

5 designates the ventilating window or wind wing which is pivotally mounted in the door body 2 on an upright axis so as to swing into different angular relations to the plane of the opening 4 or the plane of the glass 3, the pivotal axis being located nearer the front edge of the wing than the rear edge.

The body 1 is shown as formed slanting at its front end for carrying a slanting windshield and the door body 2 and glass 3 are correspondingly slanted. It is immaterial whether the window is mounted in a door or directly in the vehicle body. Owing to the fact that the front end of the window opening is slanted to conform to the slant of the windshield, the wing also correspondingly slants, and hence, when the glass 3 is lowered, more or less, the rear end of the wing can be swung outwardly, thus carrying the front edge inwardly, without being obstructed by the glass 3, so that there is ample room to form an air inlet at 6 and an outlet at the rear edge of the wing.

One of the pivotal connections of the wing, here shown, as the upper pivotal connection, is mounted to have a universal joint action and the wing 5 is so mounted at its lower pivotal connection as to be swung outwardly, as shown in Figure 3, about the upper pivotal connection, which has a universal joint action, in order to make the glass 3 available, particularly for washing.

As here shown, the wing 5 is provided with trunnions or pivots 7 and 8 at its upper and lower edges and the window frame or the upper and lower members thereof are provided with bearings for the trunnions. The upper pivot or trunnion 7 is here shown as projecting from a channel-shaped bracket 9 suitably secured to the upper edge of the wing, which trunnion has a head 10 which works in a socket 11 formed in a bracket 12 secured to the lower face of the upper member or top rail of the window frame, within the width of the frame and at one side of the window 3 or the plane in which it moves. The head 10 is provided with a suitable spherical surface in order that it may have a universal joint action. It is insertable in the socket 11 through the lower open end thereof, and retained in the socket by suitable securing means, as a snap ring 13.

The trunnion 8 is carried by one of the members of a two-member mounting detachably coupled together as will be hereinafter described, one member, as the upper member 14, having a channel-shaped body for receiving the lower margin of the wing 5 and arranged with the intermediate part of the channel formation flatwise on the face of the lower member 15. This lower member is also channel-shaped in cross section with relative narrow side walls 16, the channel of this member 15 housing the quick release means to be described. The trunnion or pivot 8 is secured to, and preferably rigid with, the member 15 and depends downwardly therefrom and has a bearing at 17 in a housing or bracket 18 secured to the lower member or rail of the window frame 2. The two members 14 and 15 are normally coupled together, so that they swing as a unit about the axis of the trunnion 8, which coupling is detachable for the purpose of permitting the member 5 with the member 14 to be demounted from the member 15.

Figure 2:
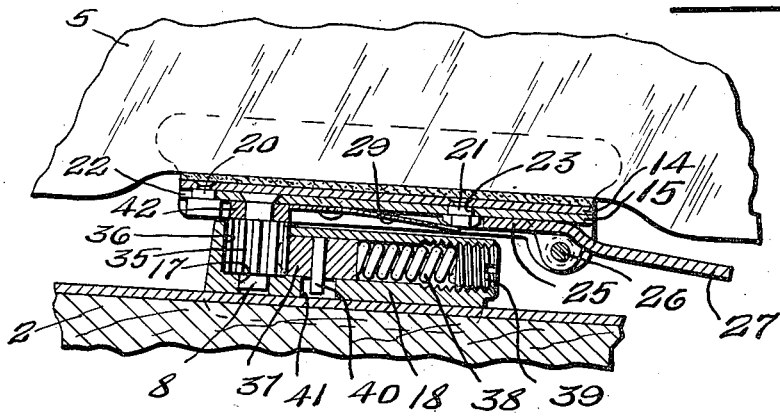
Figure 2 is an enlarged fragmentary view showing the pivotal mounting and coupling between the lower edge of the wing and the body or window frame in longitudinal section.

In the illustrated embodiment of my invention, the members 14 and 15 are coupled together by interlocking means which unlock by a successive pivotal movement and edgewise movement of the wing 5 and the member 14 relative to the member 15. In the coupling shown, one of the members 14, 15, here shown as the member 14, is provided with studs 20 and 21 spaced apart in a direction lengthwise thereof and the other member, as the lower member 15, is provided with a lengthwise slot 22 opening through one end thereof for receiving the stud 20 and with an arcuate slot 23 opening through one side thereof, as the outer side, for receiving the stud 21, which studs have heads which hook under the intermediate part of the channel-shaped member 15, on the margins of the walls confining the slots 22 and 23. The arcuate slot is struck from the center of the stud 20 when the members 14 and 15 are assembled. Thus with the quick release means, to be described, operated, the wing 5 can be demounted by swinging the wing 5 and the member 14 therewith outwardly, about the axis of the stud 20, thus carrying the stud 21 laterally out of the arcuate slot 23 and then the wing moved endwise forwardly carrying the stud 20 out of the slot 22, so that the wing can be swung outwardly about the axis of the universal joint of the upper trunnion 7, or into any position similar to that shown in Figure 2. The wing is replaced by the reverse of these operations.

The quick release means is here shown as a spring-pressed latch 25 pivoted at 26 to ears depending from the member 15 at one end thereof, the latch extending lengthwise of the channel formation of the member 15 and having a finger-piece 27 extending beyond one end of the member 15. The latch 25 is bifurcated at 28 and the space between the bifurcations receives the head of the stud 21. The latch is spring-pressed by spring means here shown as a leaf spring 29 located in the channel of the member 15 and anchored at one end at 30 therein and having its other end free and bifurcated, the bifurcations bearing at 31 on the bifurcations of the latch 25. The head of the stud 21 is bevelled as at 32 to have a ratcheting action over the bifurcations when the wing 5 is being reset after being demounted. Thus, in order to demount the wing 5, or the lower edge thereof, from the lower pivotal connection, the finger-piece 27 of the latch is lifted so that the bifurcated end of the latch clears the head of the stud 21 so that the stud 21 can move out of the arcuate slot 23 as before described.

In replacing or remounting the wing, it is first moved to carry the stud 20 into the slot 22 and then swung inwardly to carry the stud 21 into the arcuate slot 23. During the latter operation, owing to the bevelling of the head at 32 of the stud 21, the stud will ratchet or snap into final position between the bifurcations of the latch 25.

The means for holding the wing 5 in any one of a plurality of angular positions, as here illustrated, comprises a ratchet or toothed wheel 35 on the trunnion 8 and located within a suitable recess 36 in the bracket 18 and a rectilinearly movable spring-pressed head or pawl 37 slidable in a lengthwise passage in the bracket 18 and having teeth for coacting with a cam action with the ratchet wheel 35. The head or pawl 37 is pressed by a spring 38 in the bracket 18 which thrusts at one end against the head or pawl 37 and at its other end against a spring abutment or plug 39 threading in the end of the passage of the bracket 18. The head is provided with a suitable stop pin 40 working in a slot 41 in the bracket 18. The trunnion 8 is firmly fixed to the member 15 by being mounted in a block or spacer 42 secured in the channel of the member 15 in any suitable manner, as by rivets 43, and this spacer or block thrusts against the upper end of the ratchet wheel 35, the lower end of which thrusts against the bottom of the socket 36 in which it is located, so that the ratchet wheel slidably fits the recess in which it is located. The screw or spring abutment is adjustable to vary the tension of the spring, it being operable to adjust the tension to a point where the wing is locked against movement and release it to a point where very little effort is required to swing the wing into different angles.

In operation, the wing can be adjusted in any angular position by merely applying pressure in the proper direction to the rear edge thereof and the ratchet mechanism consisting of the wheel 35 and pawl 37 will automatically hold it in any adjusted position. To partially demount the wing 5 for the purpose of washing and wiping the window 3 or for any other purpose, the finger-piece 27 is elevated, releasing the stud 21 of the latch 25, the wing swung slightly outward about the pivot of the stud 20 until the stud 21 is out of the arcuate slot 23 and then the wing swung forwardly about the axis of the universal joint of the upper trunnion 7 until the stud 21 passes out of the slot 22 and then the wing can be swung outward to any desirable angle about the universal joint axis, as shown in Figure 3. In replacing the wing 5, the reverse of these movements takes place, except that it is not necessary to operate the finger-piece 27 as the head of the stud 21 will ratchet into engagement with the latch 25.

What I claim is:

1. The combination with a vehicle body formed with a window opening, of a wind wing pivoted to the body on an upright axis and mounted to swing inwardly and outwardly relatively to the opening for locating the wing in different angles to the plane of the opening, the pivotal connections being located at the upper and lower edges of the wing, the pivotal connection at one of its edges being mounted to have a universal joint action and the wing being demountable from the pivotal connection at the opposite edge, all whereby the wing can be detached at one pivotal connection and displaced outwardly about the axis of the pivot having the universal joint action, and quick release means for holding the wing from displacement from its demountable pivotal connection.

2. The combination with a vehicle body formed with a window opening, of a wind wing pivoted to the body on an upright axis and mounted to swing inwardly and outwardly relatively to the opening for locating the wing in different angles to the plane of the opening, the pivotal connections being located at the upper and lower edges of the wing, the pivotal connection at the upper edge being mounted to have a universal joint action and the wing being demountable from the pivotal connection at its lower edge, all whereby the wing can be detached at the lower pivotal connection and displaced outward about the universal joint axis of the upper connection, and quick release means for holding the wing from displacement from its demountable lower pivotal connection.

3. The combination with a vehicle body having a window frame confining a window opening, and a window mounted in the body and frame and movable vertically to open and close the window opening, of a wind wing pivotally mounted in the window opening on the outer side of the window and mounted to swing into different planes relative to the window, the pivotal connections being located between the upper and lower edges of the wing and the window frame, one of the pivotal connections having a universal joint action and the wing being demountable from the other pivotal connection, the universal joint connection permitting lateral outward swinging of the wing when the other pivotal connection is demounted.

4. The combination with a vehicle body having a window frame confining a window opening, and a window mounted in the body and frame and movable vertically to open and close the window opening, of a wind wing pivotally mounted in the window opening on the outer side of the window and mounted to swing into different planes relative to the window, the pivotal connections being located between the upper and lower edges of the wing and the window frame, one of the pivotal connections having a universal joint action and the wing being demountable from the other pivotal connection, permitting lateral swinging of the wing relatively to the window frame about the universal joint connection when the other pivotal connection is demounted, and quick release means for normally preventing the wing from demounting from the demountable pivotal connection.

5. The combination with a vehicle body having a window frame confining a window opening, a window mounted in the body and the frame and movable to open and close the window opening, of a wind wing, pivotal connections between the upper and lower edges of the wing and the upper and lower members of the window frame within the window opening, the wing being movable about its pivotal axis into different angular relations to the window, one of the pivotal connections between the wing and the frame member having a universal joint action and the wing being demountable from the other pivotal connection, the wing being movable laterally about the universal joint connection when the other pivotal connection is demounted.

6. The combination with a vehicle body having a window frame confining a window opening, a window mounted in the body and the frame and movable to open and close the window opening, of a wind wing, pivotal connections between the upper and lower edges of the wing and the upper and lower members of the window frame within the window opening, the wing being movable about its pivotal axis into different angular relations to the window, one of the pivotal connections between the wing and the frame member having a universal joint action and the wing being demountable from the other pivotal connection, the wing being movable laterally about the universal joint connection when the other pivotal connection is demounted, and quick release means for normally holding the wing from displacement from its demountable pivotal connection.

7. The combination with a frame confining a window opening, of a wind wing pivotally mounted, pivotal connections between the wing and the frame, one of said connections including a member carried by the wing and a second member carried by the frame, the second member carrying the pivot, means detachably coupling said members, whereby they swing about the pivotal axis as a unit, means for releasing the coupling means whereby the wing and the first member can be demounted from the second member, the other pivotal connection of the wing having a universal joint action.

8. The combination with a frame confining a window opening, of a wind wing pivotally mounted, pivotal connections between the wing and the frame, one of said connections including a member carried by the wing and a second member carried by the frame, the second member carrying the pivot, and means for detachably coupling said members together, said coupling means including interlocking parts unlocked by successive pivotal and radial movement of the wing and first member relative to the second member.

9. The combination with a frame confining a window opening, of a wind wing pivotally mounted, pivotal connections between the wing and the frame, one of said connections including a member carried by the wing and a second member carried by the frame, the second member carrying the pivot, and means for detachably coupling said members together, said coupling means including studs having heads on one of said members and slots in the other member, one slot extending lengthwise and receiving one of the studs and the other slot receiving the other stud and being arcuate and open at one end and struck from the axis of the former stud when interlocked in the lengthwise slot.

10. The combination with a frame confining a window opening, of a wind wing pivotally mounted, pivotal connections between the wing and the frame, one of said connections including a member carried by the wing and a second member carried by the frame, the second member carrying the pivot, and means for detachably coupling said members together, said coupling means including studs having heads on one of said members and slots in the other member, one slot extending lengthwise and receiving one of the studs and the other slot receiving the other stud and being arcuate and open at one end and struck from the axis of the former stud when interlocked in the lengthwise slot, and latch means carried by the second member and coacting with the second stud to normally hold it from movement in the arcuate slot.

JOHN F. LEVAN.